(No Model.)
O. B. BLAKESLEE.
Lever for Moving Cars.
No. 229,363. Patented June 29, 1880.
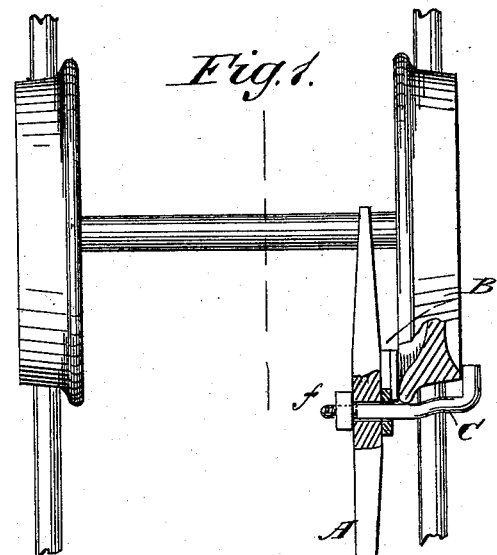
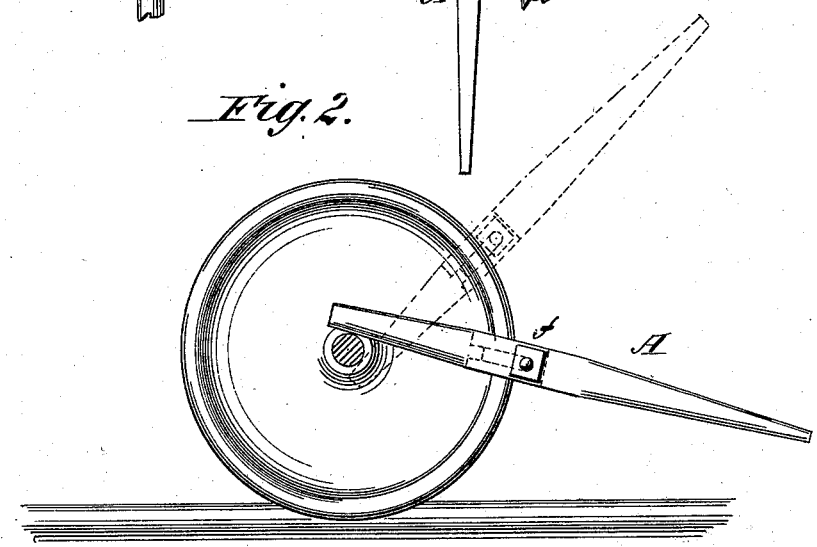
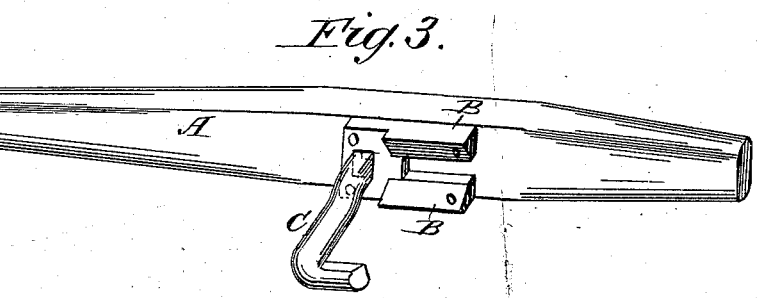
WITNESSES:
Francis McArdle.
C. Sedgwick
INVENTOR:
O. B. Blakeslee
BY Munn & Co
ATTORNEYS.

UNITED STATES PATENT OFFICE.

OWEN B. BLAKESLEE, OF RANKIN, ILLINOIS, ASSIGNOR TO HIMSELF AND JOHN T. MUG, OF LA FAYETTE, INDIANA.

LEVER FOR MOVING CARS.

SPECIFICATION forming part of Letters Patent No. 229,363, dated June 29, 1880.

Application filed May 19, 1880. (No model.)

*To all whom it may concern:*

Be it known that I, OWEN B. BLAKESLEE, of Rankin, in the county of Vermillion and State of Illinois, have invented a new and Improved Lever for Moving Cars, of which the following is a specification.

My invention consists in a lever of novel construction provided with means for enabling it to engage with the sides of a car-wheel, in order to turn it to start the car.

In the accompanying drawings, Figure 1 is a top view of a car axle and wheels with the lever applied thereto. Fig. 2 is a side view of the same. Fig. 3 is a perspective view of the lever.

Similar letters of reference indicate corresponding parts.

A represents a bar of wood or other suitable material, to one side of which are attached two triangular-shaped or sharp-edged bars of steel, B B, having their length parallel with that of the bar, and being arranged at a distance from one end of said bar somewhat greater than the distance from the axle to the periphery of the wheel. Near the bars B is a bolt, C, one end of which is bent at a right angle with its length, and the other end is screw-threaded. A portion of the bolt is angular, to prevent it from turning, and passes through a hole in the lever A, with a nut, *f*, on the threaded end.

The lever is used by resting one end against the car-axle for a fulcrum, then causing the bars B and the bent end of the bolt C to clamp the wheel between them, so that the bars B will bite on the wheel, and then pulling or pushing on the long arm of the lever. In pushing the lever is placed over the axle, as shown in full lines; in pulling it is placed under the axle, as shown in dotted lines.

By means of the nut and screw-thread the bolt may be adjusted to suit wheels of different thicknesses.

Having thus described my invention, I claim as new and desire to secure by Letters Patent—

The lever A, provided with the biting-bars B and adjustable bolt C, as shown and described, for the purpose specified.

OWEN BROWN BLAKESLEE.

Witnesses:
JOHN R. BOWERS,
CHAS. K. HANSEN.